March 28, 1933.  G. STEERUP  1,903,015
ELECTRIC HEATING PAD AND CONTROL THEREFOR
Filed Sept. 29, 1930
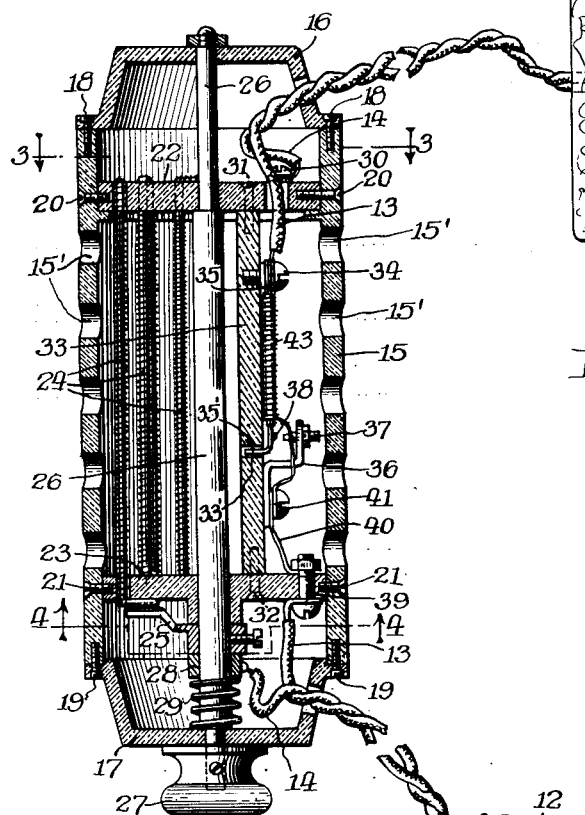
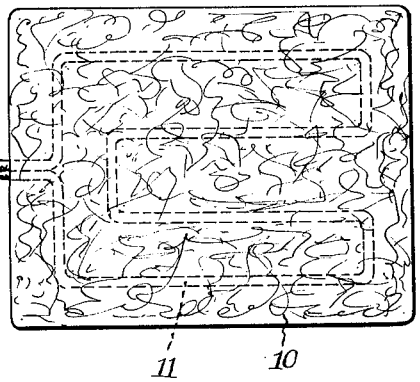
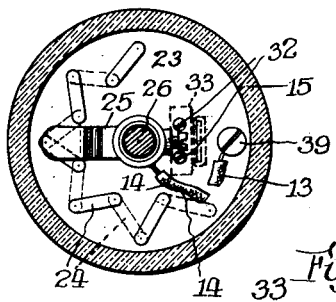
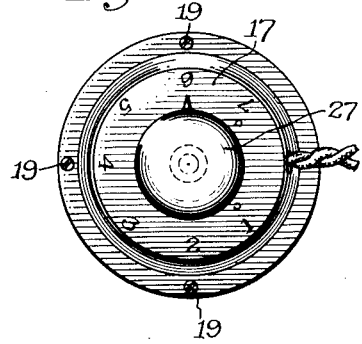
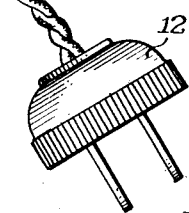
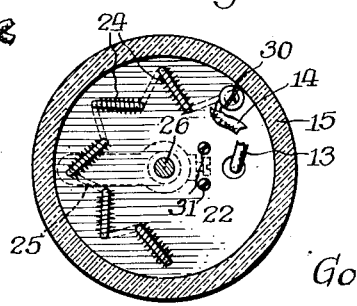
Inventor:
Godfrey Steerup,
By Fisher, Clapp, Soans & Pond Attys.

Patented Mar. 28, 1933

1,903,015

UNITED STATES PATENT OFFICE

GODFREY STEERUP, OF MAYWOOD, ILLINOIS, ASSIGNOR TO SERIC PRODUCTS COMPANY, OF CHICAGO, ILLINOIS, A PARTNERSHIP CONSISTING OF HENRY L. CHARBONNEAU AND FRANCIS J. DASHNER

ELECTRIC HEATING PAD AND CONTROL THEREFOR

Application filed September 29, 1930. Serial No. 485,026.

This invention relates to the art of electric heating pads and controls therefor. The principle of using a thermostatic switch in conjunction with the heat-giving resistance circuit for the purpose of controlling the heat is old and common, as is also the principle of using a plurality of thermostatic switches set to open the circuit at varying degrees of heat. But so far as I am aware, such thermostatic switches or heat controls have heretofore been located in or on the pad itself. Now, it is quite obvious that a heating pad used under bedside conditions has to meet a wide variety of conditions. In one case the patient uses the pad in such a way that it is more or less exposed to the cooling action of the room temperature, while in another case the pad may be buried in bed clothes and thus very effectively heat insulated. Naturally, the heat yielded by the pad under these different conditions will be widely different, although the pad may be operating on the same circuit. In the first case, it may be just right, and if that is so, then it will be too hot in the second case, and vice versa.

The thermostatic switches commonly employed on these heating pads are based on the structural principle of a thermo-couple, and for the sake of cheapness and economy, are usually made to operate on a very short gap. As a consequence of this, the timing of the thermostat varies widely depending upon the temperature conditions to which it is subjected. If the thermostat be exposed to room temperature, its "on" and "off" periods may be properly related in point of time to maintain the desired heat in the pad, whereas, if the pad be heat insulated, as when covered by bed clothes, the "on" period will be unduly prolonged, so that the heat yielded by the pad will exceed the desired heat.

The main object of the present invention is to provide an improved heating pad and thermostatic control therefor which, for a given current, will maintain a substantially uniform and constant heat in the pad irrespective of the temperature conditions surrounding the pad itself; and to this end the present invention comprises essentially a heating pad having a heating element, a thermostatic switch located outside of the pad, and a heating resistor for actuating the switch connected in series with the heating element, the switch being arranged to short circuit the resistor, and the resistor, when in circuit, reducing the flow of current through the heating element. Still other objects and attendant advantages of the invention will be apparent to persons skilled in the art as the same becomes better understood by reference to the following description taken in connection with the accompanying drawing in which I have illustrated one practical and approved embodiment of the principle of the invention and wherein—

Fig. 1 is a plan view of a heating pad and a circuit control therefor, the control element appearing in longitudinal section and the circuit conductor being broken out.

Fig. 2 is a bottom plan view of the circuit control element.

Fig. 3 is a transverse section taken on the line 3—3 of Fig. 1.

Fig. 4 is a transverse section taken on the line 4—4 of Fig. 1.

Fig. 5 is an elevation of the thermostatic switch.

Fig. 6 is a cross section, enlarged, on the line 6—6 of Fig. 5.

Referring to the drawing, 10 designates as an entirety the body of the heating pad, which may be of any usual or approved structure, and 11 designates the heating element in the pad, preferably taking the form of the conventional nichrome wire, wound on an asbestos core and covered with asbestos. Preferably also a single circuit heating element, as shown, is employed, since this renders the pad more flexible than where a larger amount of resistance wire is bunched together. The ends of the resistance element 11 are connected to an ordinary plug 12 by the usual cord conductor comprising circuit wires 13 and 14. Interposed in the cord conductor is a thermostatic switch controlling the circuit; and preferably there is also interposed in the cord conductor a rheostat by which the amount of current passing into the heating element may be varied at will. The thermostatic switch is disposed in series with the heating element of the pad and is itself preferably heated by a high resistance wire included in the circuit, and, where a rheostat is employed, this is also disposed in series with the heating pad and the switch. As a convenient mounting for the switch and rheostat, I preferably provide a cylindrical shell 15 formed with end caps 16 and 17 secured to the ends of the shell as by screws 18 and 19 respectively. Secured within the shell 15 as by screws 20 and 21, are a pair of discs 22 and 23 of insulating material, mounted in and extending between which discs are a plurality of connected loops 24, together forming the resistance element of a rheostat; the bends of the loops underlying the disc 23 being adapted to be wiped over by an arm 25 that is keyed on a central metal shaft 26 journaled in the caps 16 and 17 and extending through the discs 22 and 23. On the lower end of the shaft 26 is a knob 27 by which the shaft may be turned, and encircling the shaft 26 below the hub of the arm 25 is a metal collar 28 pressed against the hub of the arm 25 by a thrust spring 29. Soldered to the collar 28 is the plug section of the conductor wire 14; and electrically connected to one terminal of the rheostat as by a binding screw 30 (Fig. 3) is the pad section of the conductor wire 14.

Attached to and between the heads 22 and 23 of the rheostat, as by screws 31 and 32 is a switch supporting strip 33 of asbestos or other insulating material, and mounted on one face of the supporting strip 33, as by a screw 34 is the bimetallic bar 35 (Fig. 6) of the thermostatic switch. Attached to the support 33 below the free end of the bar 35 is a bracket 36, in the upper end of which is mounted an adjustable gap controlling screw 37, the inner end of the screw lying directly opposite a tit 38 on the outer face of the switch bar 35. To prevent any accidental lateral displacement of the switch bar 35, the lower end of the latter is preferably bent inwardly as shown at 35' in Fig. 1 and enters a slot 33' in the support 33.

The plug section of the conductor wire 13 is secured to the lower end of a binding post 39 mounted in the lower head 23 of the rheostat, and the upper end of the binding post 39 is electrically connected by a wire 40 to the bracket 36 by a binding screw 41. The switch bar 35 is enclosed in a wrapping or sheath 42 of asbestos (Fig. 6), and encircling the asbestos wrapping is a coil 43 of fine, high resistance wire. The lower end of this coil is electrically connected to the conductor 40, and its upper end and the upper end of the switch bar 35 are electrically connected to the pad section of the wire conductor 13.

The shell member 15 is preferably perforated throughout its intermediate portion, as indicated at 15' in Fig. 1, to permit free circulation of air around the rheostat and thermostatic switch and thus avoid undue heating of the switch by the heat emitted by the rheostat.

The thermostatic switch is normally open, as shown in Fig. 1, in which position the main circuit to the pad is broken. However, the circuit through the thermostat coil 43 is continuously closed so long as the circuit is closed at the plug 12, so that, when the latter is plugged in, the switch bar is heated by its coil 43, and this brings the contacts 38 and 37 together, closing the main circuit to the heating element 11 of the pad. As soon as the main circuit is closed, the current no longer flows through the thermostat coil 43, so that the latter quickly cools, and this in turn breaks the main circuit at the terminals 37, 38. As soon as the main circuit has been broken, the current once more flows through the coil 43, again causing the switch to close the main circuit, and this cycle is repeated at longer or shorter intervals depending upon the length of the gap at 37, 38; this gap being adjusted to the period desired by setting the adjusting screw 37 inwardly or outwardly. It may here be stated that the current flowing through the heating resistor 43 and thence through the heating element 11 of the pad is so small as to have no appreciable heating effect upon the pad, and consequently to be negligible.

The amount of current permitted to flow to the pad may be varied by turning the knob 27 in one direction or the other, in a manifest manner.

From the foregoing it will be evident that the operation of the thermostatic switch, and its time periods, are wholly unaffected by thermal conditions within or immediately surrounding the heating pad itself, but are affected only by thermal conditions immediately surrounding the switch, and the chief element of these latter conditions is the room temperature which is substantially constant for considerable periods of time. Hence, the ratio of the on and off periods remains substantially uniform, and the heat yielded by the pad remains substantially constant, for a given setting of the rheostat, regardless of whether the pad itself is exposed or heat-insulated by the bedding. It will thus be seen that the principle of control involved in the device of the present invention, due to its constructional features with a normally open circuit, lies in letting pass into the pad a certain amount of thermal units, instead of relying on a circuit break at any specified temperature in the pad.

I have herein shown and described a specific embodiment of the invention which in practice has been found to satisfactorily effectuate the stated purposes and objects thereof; but it is evident that various modifications may be made in the device without departing from the spirit and scope of the invention, and hence I reserve all such modifications and variations as fall within the spirit and purview of the appended claims.

I claim:

1. The combination with a pad having a heating element, of a normally open thermostatic switch in the circuit of said heating element and outside of said pad, and a heating resistor for closing said switch connected in series with said heating element, said switch being arranged to short circuit said heating resistor, and said resistor, when in circuit, reducing the flow of current through said heating element.

2. The combination with a pad having a heating element, and cord conductors for said element, of a resistance coil interposed in one of said conductors at a distance from the pad and adapted, when in circuit, to reduce the flow of current to said heating element, and a normally open thermostatic switch interposed in one of said conductors closed by the heating action of said resistance coil and when so closed short circuiting the latter.

3. In combination with a pad having an electric heating element, a normally open thermal switch disposed outside of the pad and connected in series with said heating element, and a heating resistor for closing said switch connected in series with said heating element, said switch operating, when closed, to short-circuit said resistor, and said resistor operating, when in circuit, to reduce the flow of current through said heating element.

4. In combination, an electric heating pad having a heating element, a heating resistor connecting in series with said heating element for reducing the flow of current therethrough, and a normally open thermostatic switch for short circuiting the resistor when closed, said switch and resistor being disposed outside of the pad, and the switch arranged to be actuated by the resistor independently of the heating element of the pad.

GODFREY STEERUP.